United States Patent [19]

Takagi et al.

[11] Patent Number: 5,661,360

[45] Date of Patent: Aug. 26, 1997

[54] ULTRASONIC MOTOR HAVING HIGH DRIVE EFFICIENCY

[75] Inventors: Tadao Takagi, Yokohama; Daisuke Saya, Urayasu, both of Japan

[73] Assignee: Nikon Corporation, Tokyo, Japan

[21] Appl. No.: 484,861

[22] Filed: Jun. 7, 1995

Related U.S. Application Data

[62] Division of Ser. No. 385,576, Feb. 8, 1995, which is a continuation of Ser. No. 128,273, Sep. 29, 1993, abandoned, which is a continuation of Ser. No. 769,467, Oct. 1, 1991, abandoned, which is a division of Ser. No. 475,000, Feb. 5, 1990, Pat. No. 5,066,884.

[30] Foreign Application Priority Data

| Feb. 10, 1989 | [JP] | Japan | 1-32085 |
| Mar. 1, 1989 | [JP] | Japan | 1-50711 |
| Sep. 16, 1989 | [JP] | Japan | 1-240375 |
| Oct. 12, 1989 | [JP] | Japan | 1-265793 |
| Dec. 21, 1989 | [JP] | Japan | 1-332299 |

[51] Int. Cl.$^6$ .................................................. H01L 41/08
[52] U.S. Cl. .................................................. 310/323
[58] Field of Search .................................... 310/323, 328

[56] References Cited

U.S. PATENT DOCUMENTS

| 4,634,915 | 1/1987 | Mukohjima et al. | 310/323 |
| 4,649,311 | 3/1987 | Mukohjima et al. | 310/323 |
| 5,017,823 | 5/1991 | Okumura | 310/323 |
| 5,066,884 | 11/1991 | Takagi et al. | 310/323 |

FOREIGN PATENT DOCUMENTS

| 0190570 | 8/1988 | Japan | 310/323 |

*Primary Examiner*—Mark O. Budd
*Attorney, Agent, or Firm*—Shapiro and Shapiro

[57] ABSTRACT

An ultrasonic motor has a stator having a piezoelectric member vibrated by a drive signal, and an elastic member for generating traveling vibration wave in a drive surface thereof upon vibration of the piezoelectric member, a rotor which is urged against the drive surface of the elastic member and is driven by the generated traveling vibration wave, a support member integrally molded on the elastic member, and a fixing member for holding the support member. In the ultrasonic motor, one end face of the support member is formed at the same level as the drive surface or the junction surface of the elastic member, an electrode of the piezoelectric member is grounded through the support member, a plurality of holes are regularly formed in the circumferential direction of the support member, or the support member is fixed to the fixing member by an adhesive, thereby improving drive efficiency.

8 Claims, 8 Drawing Sheets

ULTRASONIC MOTOR HAVING HIGH DRIVE EFFICIENCY

This is a division of application Ser. No. 08/385,576 filed Feb. 8, 1995, which is a continuation of application Ser. No. 08/128,273 filed Sep. 29, 1993 (abandoned), which is a continuation of application Ser. No. 07/769,467 filed Oct. 1, 1991 (abandoned), which is a division of application Ser. No. 07/475,000 filed Feb. 5, 1990, now U.S. Pat. No. 5,066,884 issued Nov. 19, 1991.

BACKGROUND OF THE INVENTION

1. Field of the Invention

The present invention relates to an ultrasonic motor having high drive efficiency, which causes a stator to generate a traveling vibration wave, thereby driving a rotor. More particularly, the present invention relates to an ultrasonic motor having high drive efficiency, which causes an elastic member to generate a traveling vibration wave upon vibration having a vibration frequency in an ultrasonic range of a piezoelectric member, thereby driving a rotor.

2. Related Background Art

The structure of a conventional ultrasonic motor is disclosed in, e.g., JP-A-62-77068. FIG. 6 is a sectional view of the ultrasonic motor. A stator 1 is constituted by integrally fixing a piezoelectric member 1b to an elastic member 1a. A radial support member 3 is integrally molded on an inner peripheral surface of the elastic member 1a near a neutral axis of the stator 1 as a whole. The support member 3 has a thin plate portion 3a provided to the inner peripheral surface of the elastic member 1a, and a thick portion 3b provided on the peripheral edge of the thin plate portion 3a and having a larger thickness than that of the thin plate portion 3a. A technique for integrally molding the support member to the elastic member in this manner is also disclosed in, e.g., JP-A-59-213286. The thick portion 3b is fixed in a case 5 which receives a bearing 4.

A flange portion 6a radially projects from the inner periphery of the rotor 2, and a thick portion 6b is integrally molded on the peripheral edge of the flange portion 6a. A compression force by a given means (not shown) is applied to the thick portion 6b through a bearing 7, so that a lower surface 8 of the rotor 2 is urged against a drive surface 1c of the elastic member 1a.

When an AC voltage is applied to the piezoelectric member 1b, the piezoelectric member 1b causes bending vibration, and a traveling vibration wave is generated in the elastic member 1a. This vibration wave frictionally drives the rotor 2. The generation mechanism of the traveling vibration wave is described in detail in JP-A-60-245482, and a description thereof will be omitted.

In the above structure, when the thick portion 3b of the support member 3 is fixed by a pressing 40 and a fixing cylinder 50 or their equivalents shown in FIG. 2, the following problems are posed. If a lower end face 3c of the thick portion 3b of the support member 3 is not flat, when the thick portion 3b is fixed by the pressing 40 and the fixing cylinder 50 shown in FIG. 2, an internal stress is generated in the elastic member 1a, thus decreasing drive efficiency of the ultrasonic motor. On the other hand, if a junction surface 1d of the elastic member 1a contacting the piezoelectric member 1b is not flat, when the piezoelectric member 1b is fixed to the elastic member 1a, an internal stress is generated in the elastic member 1a, and also decreases drive efficiency of the ultrasonic motor. As shown in FIG. 6, when the lower end face 3c of the thick portion 3b and the junction surface 1d of the elastic member 1a do not exist on the same plane, it is almost impossible to simultaneously polish these surfaces.

The structure of a conventional stator is disclosed in, e.g., JP-A-60-245482. FIGS. 10 and 11 show this structure. A stator 10 is constituted by adhering an annular elastic member 11 and an annular piezoelectric member 12. A plurality of electrodes 13 (FIG. 11) are formed on the upper surface of the piezoelectric member 12, and electrodes 14a to 14d are also formed on its lower surface. The elastic member 11 is adhered to the piezoelectric member 12 so as to be electrically connected to all the electrodes 13. These electrodes are magnetized to alternately have opposite polarities. One-end portions of lead wires 15 and 16 are respectively soldered to the electrodes 14a and 14b. An AC voltage is applied to the electrodes 14a and 14b through these lead wires 15 and 16. The other end of a lead wire 17, one end of which is grounded, is soldered to the electrode 14c. The electrode 14c is electrically connected to the elastic member 11 through a conductive adhesive 18.

In the above-mentioned structure, all the electrodes 13 are grounded through the elastic member 11, the conductive adhesive 18, the electrode 14c, and the lead wire 17. Therefore, when an AC voltage is applied to the electrodes 14a and 14b, this is equivalent to apply a voltage to the widthwise direction of the piezoelectric member 12. When a predetermined AC voltage is applied to the electrode 14a through the lead wire 15, and an AC voltage having a 90° phase difference from the predetermined voltage is applied to the electrode 14b through the lead wire 16, the piezoelectric member 12 is vibrated by these applied voltages. Upon this vibration, a traveling vibration wave is generated in a drive surface 11a of the electric member 11.

However, in this structure, the elastic member 11 and the electrode 14c are electrically connected through the conductive adhesive 18 to ground the electrodes 13. Therefore, the adhesive 18 is degraded by vibration of the elastic member 11 in use, resulting in a grounding error of the electrodes 13. Since ultrasonic vibration has a high frequency, it has a peeling effect as demonstrated in ultrasonic washing. Thus, the ground lead wire 17 may be directly connected to the elastic member 11 through a screw or the like so as not to disconnect the lead wire 17. However, undesirable vibration occurs in the connected portion due to the weight of the screw, and as a result, smooth driving is disturbed.

In some motors, as disclosed in Japanese Patent Laid-Open (Kokai) No. 59-178988, a comb-like groove is formed in the drive surface of the elastic member to improve drive efficiency.

As a support method of the stator, the following methods are known:

(1) A method of supporting the stator by arranging a shock absorber such as a felt on the lower surface of the piezoelectric member;

(2) A method of supporting the stator by arranging a flange-like support member extending from an outer or inner peripheral surface of the stator near a neutral surface and clamping the support member by fixing members; and (3) A method of supporting the stator by arranging a plurality of rod-like sub vibration members radially extending from the outer or inner peripheral surface of the stator near a neutral surface, and placing the distal ends of the vibration members on the support member, as disclosed in Japanese Patent Laid-Open (Kokai) No. 60-96183 (corresponding to U.S. Pat. No. 4,634,915).

However, in the method (1) of supporting the stator by the felt, the felt has poor weather resistance, and a drive condition largely changes due to aging of the felt, resulting in poor reliability. In the method (2) of supporting the stator by the flange, since a bending strength of the flange portion cannot be lowered, drive efficiency is decreased. In addition, in the method (3) of supporting the stator by the rod-like sub vibration members, since a large number of rod-like sub vibration members having a small width and thickness must be arranged to have high dimensional precision, and are difficult to work, resulting an expensive structure. If each rod-like sub vibration member is thick, its mechanical strength is increased, and the vibration of the stator is externally transmitted through the support member, resulting in generation of noise.

SUMMARY OF THE INVENTION

It is an object of the present invention to improve drive efficiency of an ultrasonic motor by reducing an internal stress generated in an elastic member when a support member of the elastic member is clamped and fixed by fixing members.

It is another object of the present invention to improve drive efficiency of an ultrasonic motor by improving durability of a slider member of a rotor which is frictionally driven on an elastic member and by improving weather resistance caused by a change in environmental condition such as a temperature, humidity, and the like.

It is still another object of the present invention to improve drive efficiency of an ultrasonic motor by preventing a grounding error of electrodes formed on a stator caused by unnecessary vibration generated in an elastic member.

It is still another object of the present invention to improve drive efficiency of an ultrasonic motor and to prevent generation of noise by decreasing a bending strength of a support member of an elastic member to improve a vibration condition of the elastic member.

It is still another object of the present invention to improve drive efficiency of an ultrasonic motor and to prevent generation of noise by eliminating a support loss of a support member of an elastic member.

In order to achieve the above objects, according to the present invention, there is provided an ultrasonic motor having a stator consisting of a piezoelectric member and an elastic member, a rotor which is brought into contact with the stator under pressure, a support member for holding the stator, and a fixing member, the support member consisting of a thin plate portion and a thick portion being integrally molded on an outer or inner peripheral surface of the elastic member, wherein one end face of the thick portion is formed at the same level as a drive surface or a junction surface of the elastic member with the piezoelectric member. Thus, the junction surface of the elastic member with the piezoelectric member and one end face of the thick portion of the support member can be simultaneously polished. The drive surface of the elastic member and the other end face of the thick portion of the support member can be simultaneously polished. Therefore, the junction surface of the elastic member and one end face of the thick portion, or the drive surface of the elastic member and the other end face of the thick portion can be kept flat. Even if the thick portion is clamped and fixed by the fixing members, no internal stress is generated in the elastic member, thus improving drive efficiency of an ultrasonic motor.

In order to achieve the objects of the present invention, the elastic member of the stator is formed of an invar material, and a slider member of the rotor is formed of a material containing polytetrafluoroethylene (PTFE), thereby decreasing wear of the slider member of the rotor and increasing a durability-limit rotation count. In addition, the slider member can be prevented from being stuck to the elastic member due to an increase in temperature or humidity. In this manner, the durability and weather resistance of the rotor are improved to improve drive efficiency of the ultrasonic motor.

In order to achieve the objects of the present invention, there is also provided an ultrasonic motor in which a first electrode is arranged on a surface of a piezoelectric member on a side contacting an elastic member, a second electrode is arranged on an opposite surface, the first electrode is grounded through the elastic member, and an AC voltage is applied to the second electrode to vibrate the piezoelectric member, comprising grounding means for grounding the first electrode through a support member integrally formed on the outer or inner peripheral surface of the elastic member. With this structure, when the piezoelectric member vibrates and a traveling vibration wave is generated in the elastic member, a grounding error of the first electrode can be prevented, thus improving drive efficiency of the ultrasonic motor.

In order to achieve the object of the present invention, in an ultrasonic motor of the present invention, a plurality of holes are regularly formed in a circumferential direction in a support member which is integrally formed on a side surface of an elastic member. In addition, in the ultrasonic motor of the present invention, a comb-like groove is formed in the elastic member, and a plurality of holes are periodically formed in the support member integrally formed on the side surface of the elastic member in association with the cycle of the comb-like groove. Thus, the bending strength of the support member can be decreased, and the vibration condition of the elastic member is improved. Therefore, drive efficiency of the ultrasonic motor can be improved, and generation of noise can be prevented.

Furthermore, in order to achieve the objects of the present invention, there is also provided an ultrasonic motor in which a support member integrally arranged on a side surface of an elastic member is clamped and fixed by a pressing and a fixing cylinder, wherein the support member is adhered to at least one of the pressing and the fixing cylinder by an adhesive. With this structure, the support loss of the support member can be eliminated, thus improving drive efficiency of the ultrasonic motor, and preventing generation of noise.

BRIEF DESCRIPTION OF THE DRAWINGS

FIGS. 1 and 2 show an embodiment of an ultrasonic motor according to the present invention, in which FIG. 1 is an exploded sectional view of the motor, and FIG. 2 is a sectional view of the motor after assembly;

FIGS. 10 and 11 show a structure of a conventional stator, in which FIG. 10 is a perspective view thereof, and FIG. 11 is a sectional view thereof;

DESCRIPTION OF THE PREFERRED EMBODIMENTS

An embodiment of the present invention will be described hereinafter with reference to FIGS. 1 to 3.

Figure 1:
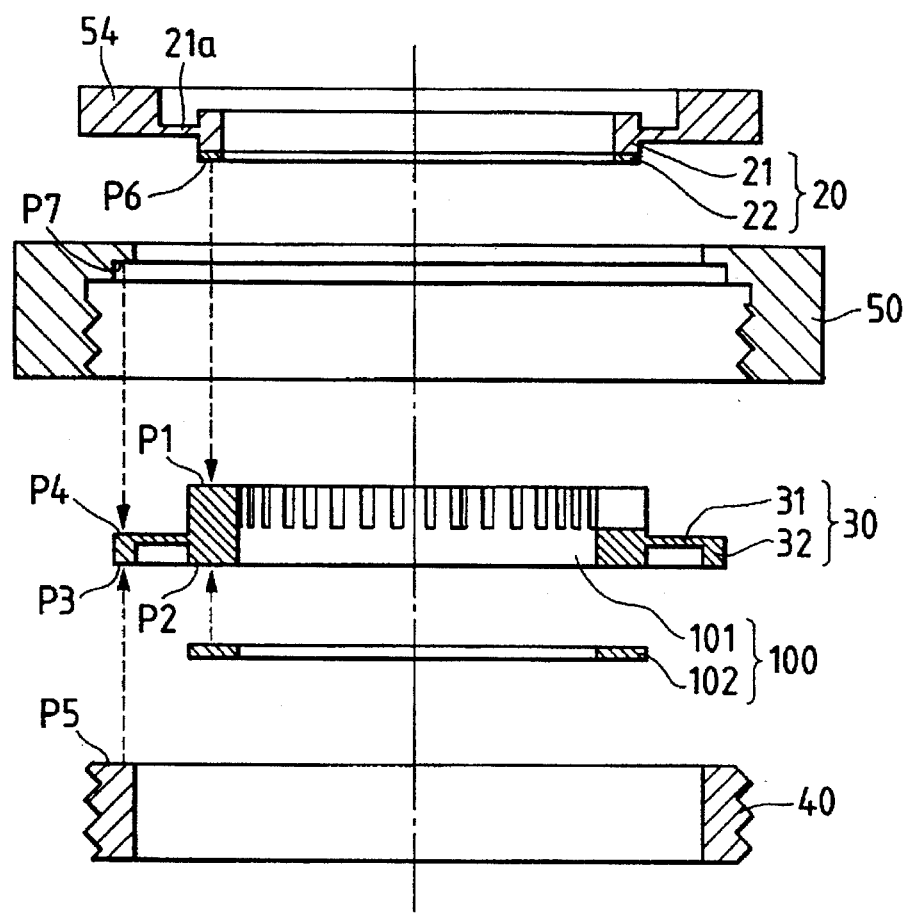
Figure 2:
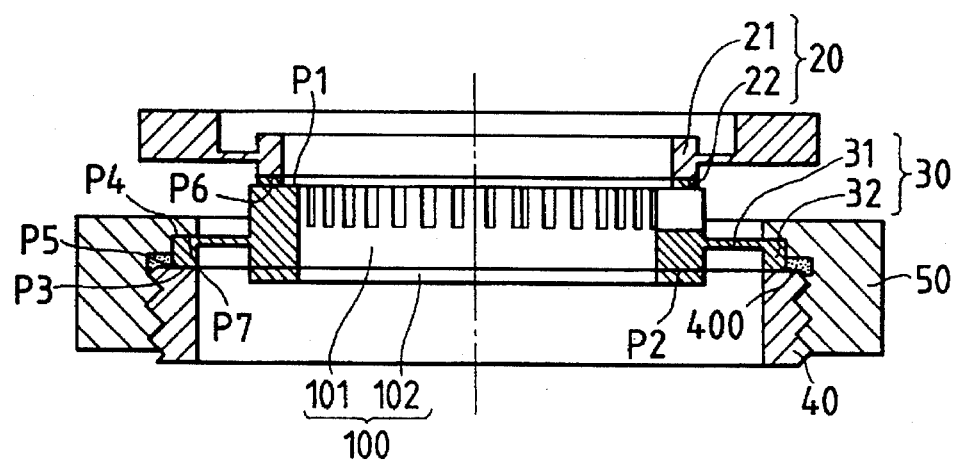
Figure 3:
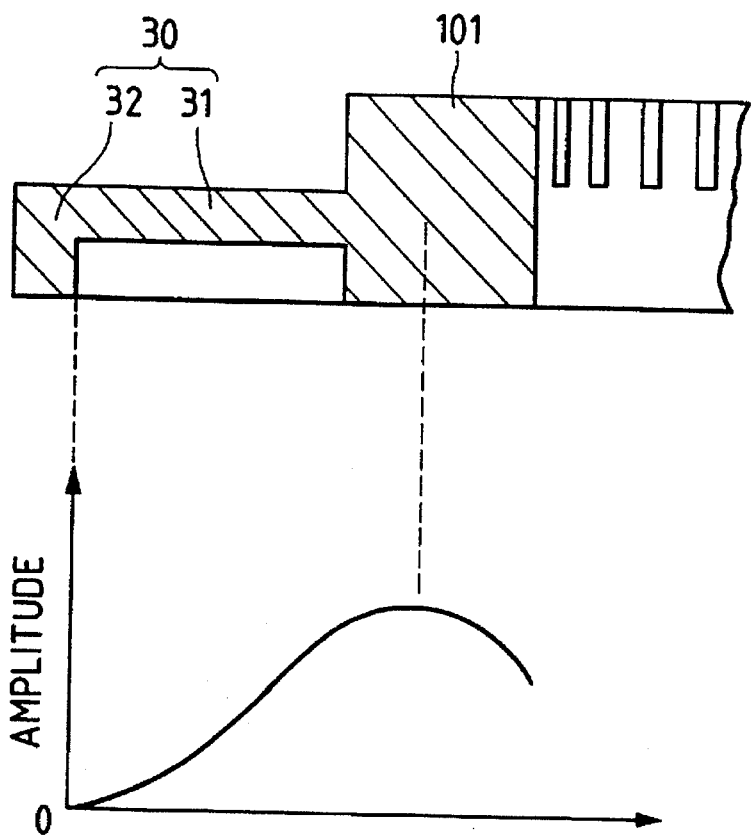
FIG. 3 shows an amplitude of a vibration wave acting on an elastic member and a support member in the embodiment shown in FIGS. 1 and 2.

FIG. 1 is an exploded sectional view of an ultrasonic motor according to the present invention, and FIG. 2 is a sectional view thereof after assembly. A stator 100 is constituted by a ring-like elastic member 101, and a ring-like piezoelectric member 102 adhered to a junction surface P2 of the elastic member 101. A drive surface P1 of the elastic member 101 has a flatness tolerance of 0.5 μm or less by polishing. A radial flange-like support member 30 is integrally formed on the elastic member 101 by cutting the elastic member 101 from its outer peripheral surface near a neutral surface of the stator 100 as a whole. The support member 30 has a 0.3-mm thick thin plate portion 31 contiguous with the outer peripheral surface of the elastic member 101, and a thick portion 32 contiguous with the thin plate portion 31. The thickness of the thick portion 32 is sufficiently larger than that of the thin plate portion 31. In this embodiment, a lower end face P3 of the thick portion 32 is at the same level as the junction surface P2 of the elastic member 101.

The junction surface P2 of the elastic member 101 must be finished to have the same flatness as that of the drive surface P1 by polishing since it must be electrically connected to all the electrodes of the piezoelectric member 102 when it is adhered to the piezoelectric member 102. In this embodiment, since the junction surface P2 and the lower end face P3 of the thick portion 32 are at the same level, the end face P3 can be simultaneously polished upon polishing of the junction surface P2. In addition, a surface P5 of the pressing 40, which is brought into contact with the polished end face P3 is also subjected to polishing.

A rotor (movable element) 20 comprises a ring-shaped rotor base 21, and a slider member 22 adhered to the rotor base 21. A lower surface P6 of the slider member 22 is polished to the same flatness as that of the drive surface P1 after the slider member 22 is adhered to the rotor base 21, so that the lower surface P6 can be in uniform contact with the drive surface P1 of the elastic member 101.

As shown in FIG. 2, after the piezoelectric member 102 is adhered to the junction surface P2 of the elastic member 101, the pressing 40 is threadably engaged with the fixing cylinder 50, so that the upper and lower end faces P4 and P3 of the thick portion 32 of the support member 30 are clamped between a surface P7 of the fixing cylinder 50 and the surface P5 of the pressing 40. In this case, since the lower end face P3 of the thick portion 32 and the surface P5 of the pressing 40 have been polished, even if the surface P7 of the fixing cylinder 50, which is difficult to be polished, is merely lathed, i.e., even if the surface P7 does not have high flatness, the flatness of the drive surface P1 of the elastic member 101 will not be degraded.

In this embodiment, the pressing 40 has a larger thickness than that of a surface P7 portion of the fixing cylinder 50, and the thick portion 32 of the support member 30 is clamped by the pressing 40 and the fixing cylinder 50, so that the influence of the stress acting on the elastic member 101 is determined by a contact state between the surface P5 of the pressing 40 and the surface P3 of the thick portion 32.

The slider member 22 is adhered to the rotor base 21, and the lower surface P6 of the slider member 22 is urged against the drive surface P1 of the elastic member 101 by a pressing member (not shown).

When an AC voltage (drive signal) is applied to the piezoelectric member 102 in this state, the piezoelectric member 102 causes bending vibration, and a traveling vibration wave is generated in the drive surface of the elastic member 101. Thus, the vibration wave drives the rotor 20. In this case, the amplitude of the vibration wave acting on the support member 30 and the elastic member 101 is as shown in FIG. 3. More specifically, since the thick portion 32 is fixed at a contiguous portion between the thin plate portion 31 and the thick portion 32, the amplitude is almost zero, and the amplitude of the thin plate portion 31 is increased as getting closer to the elastic member 101. The amplitude near the central portion of the elastic member 101 is maximum. Therefore, even if the thick portion 32 having a large thickness is arranged, drive efficiency of the ultrasonic motor will not be decreased as compared to that of a conventional motor.

Since the junction surface P2 of the elastic member 101 and the end face P3 of the thick portion 32 are at the same level, the end face P3 can be simultaneously polished upon polishing of the junction surface P2. As a result, efficiency of a polishing operation can be improved. More specifically, in polishing, a member to be worked is polished while rotating it on a polishing plate which is finished to have high flatness. In order to polish the surfaces P2 and P3 with steps, a work of a surface at a lower step is difficult and inefficient. In this embodiment, since the surfaces P2 and P3 can be simultaneously polished in a single polishing operation, it is very efficient as compared to a case wherein surfaces P2 and P3 are worked with steps, and easy mass-production can be expected.

Figure 4:
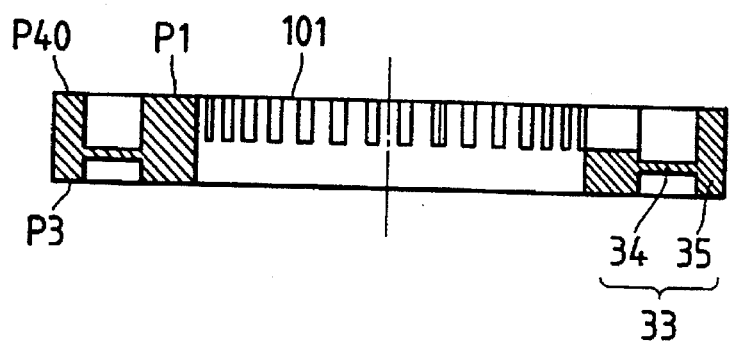
FIG. 4 is a sectional view showing another embodiment of an elastic member and a support member constituting an ultrasonic motor according to the present invention.

FIG. 4 shows another embodiment wherein a thick portion 35 of a support member 33 also projects on the side of the drive surface P1 of the elastic member 101, and its upper end face P40 is worked at the same level as the drive surface P1. In this case, the end face P40 can be simultaneously polished when the drive surface P1 is polished. In this case, the positions of the pressing 40 and the fixing cylinder 50 are reversed to hold the stator 100. More specifically, the surface P5 of the pressing 40 is in contact with the upper end face P40 of the thick portion 35. When the thick portion 35 is clamped by the pressing 40 and the fixing cylinder 50, no internal stress is generated in the elastic member 101.

Figure 5:
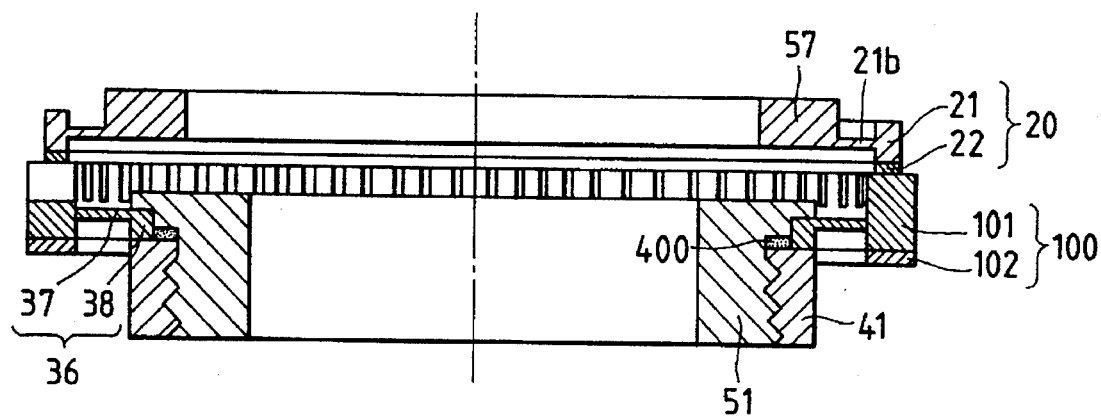
FIG. 5 is a sectional view showing another embodiment of an ultrasonic motor according to the present invention.
Figure 6:
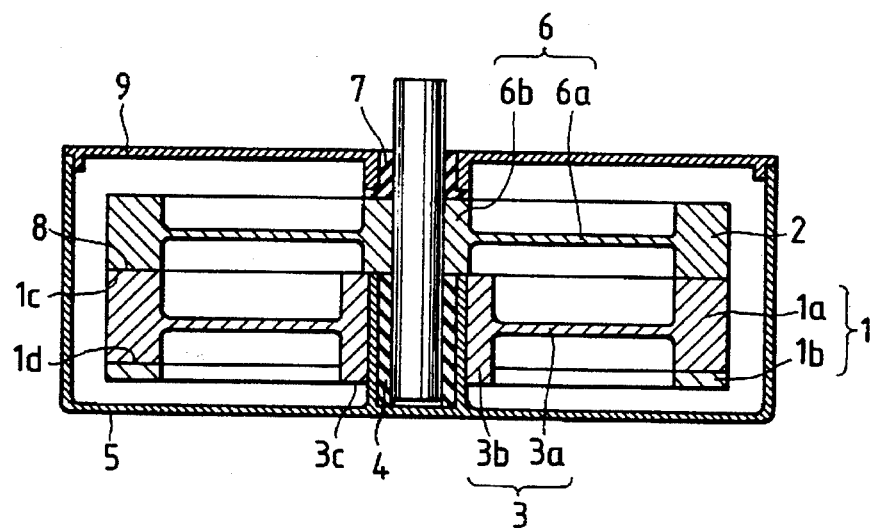
FIG. 6 is a sectional view showing a structure of a conventional ultrasonic motor.

In the above embodiment, the support member is formed on the outer peripheral surface of the elastic member. However, as shown in FIG. 5, a support member 36 may be formed on an inner peripheral surface of the elastic member 101. In this case, a thick portion 38 of the support member 36 is clamped and fixed by a pressing 41 and a fixing cylinder 51 which are located on the inner periphery of the stator 100.

The material of the slider member 22 will be described in detail below.

The present applicant conducted performance tests about six slider members No. 1 to No. 6 shown in Table 1 upon selection of an optimal slider member therefrom. In this case, as the elastic member 101 constituting the stator 100, Fe-36Ni invar was used. In the performance tests, maximum efficiency values (%) of motors were obtained, as shown in Table 2, and it was found from the test results that the slider members No. 1 and No. 4 to No. 6 were good in efficiency at almost the same level. The present applicant conducted wear-resistance tests of these slider members No. 1 and No. 4 to No. 6, and obtained the results shown in Table 2. Then, it was found that the slider members No. 5 and No. 6 were superior in terms of a wear level and a durability-limit rotation count.

The present applicant then conducted acceleration reaction tests of the slider members No. 5 and No. 6. More specifically, in an ultrasonic motor, a slider member is always brought into contact with an elastic member at a constant compression force. Thus, if a motor has not been operated for a long period of time, the slider member is stuck to the elastic member, and the motor can never be driven. In this test, in order to check the presence/absence of sticking, the slider members No. 5 and No. 6 were left in an atmosphere at a humidity of 90% and a temperature of 80° C. while being in contact with the elastic members at a constant compression force. As a result, the slider member No. 5 exhibited a sticking reaction, while the slider member No. 6 did not exhibit any sticking reaction and were normally driven after the test. Performance (efficiency) using the slider member No. 6 after all the tests was almost the same as the results shown in Table 2.

Finally, the present applicant conducted a test of combining the slider member No. 6, and a phosphor-bronze stator and a stainless-steel (SUS301) stator. As a result, it was found that the slider No. 6 was firmly stuck to the phosphor-bronze stator, and that it might or might not be stuck to the stainless-steel slider.

Thus, it was found that the slider member No. 6, i.e., a material containing PTFE (80 wt. %)+glass fiber (15 wt. %)+molybdenum disulfide (5 wt. %) was most suitable for the slider member. In addition, it was also found that if an invar material was used as a material of a stator combined with the slider member No. 6, the motor could be used regardless of an atmosphere (condition); if stainless steel was used, application conditions must be limited.

TABLE 1

| NO. | Slider Member Composition |
| --- | --- |
| 1 | Bismaleimide Triamine Resin + Kevlar Fiber |
| 2 | Polyester Resin + Kevlar Fiber |
| 3 | Epoxy Resin + Kevlar Fiber |
| 4 | Polyamideimide Resin + PTFE (3 wt. %) + Graphite (12 wt. %) |
| 5 | Ekonol E101 (70 wt. %) + PTFE (30 wt. %) |
| 6 | PTFE (80 wt. %) + Glass Fiber (15 wt. %) + Molybdenum Disulfide (5 wt. %) |

PTFE: Polytetrafluoroethylene

TABLE 2

| No. | Maximum Efficiency (%) | Wear | Djurability-Limit Rotation count | Sticking |
| --- | --- | --- | --- | --- |
| 1 | 27.5 | Large | About 180,0000 Reversible Rotations | — |
| 2 | 17.5 | — | — | — |
| 3 | 23.0 | — | — | — |
| 4 | 28.1 | Medium | About 40,000 Reversible Rotations | — |
| 5 | 28.0 | Very Small | About 100,000 Reversible Rotations | Yes |
| 6 | 27.0 | Very Small | About 800,0000 Reversible Rotations or More | No |

The above test results reveal the followings.

The influence of the material of the slider member to the drive efficiency of a motor has not been clear at present. The slider members No. 1, No. 2, and No. 3 contain the Kevlar fibers, and of these members, only the slider member No. 3 has poor efficiency. Therefore, it can be estimated that the poor efficiency is not caused by the Kevlar fiber but by a content of a polyester resin or an epoxy resin.

As can be seen from TABLE 2, in the wear resistance test, better test results are obtained when a material having a low coefficient of friction is used. More specifically, since the slider member No. 1 does not contain a material having a low coefficient of friction at all, it suffers from largest wear. Although the slider member No. 4 contains a material of a low frictional coefficient, i.e., PTFE, Since its content is as low as 3 wt. %, the wear is medium. However, under a normal use condition, the member No. 4 can assure a sufficient wear resistance. The slider members No. 5 and No. 6 contain PTFE as high as 30 wt. % and 80 wt. %, respectively, and hence, they assure very small wear.

In this manner, as shown in TABLE 2, the slider member can contain 3 to 100 wt. % of a material of a low coefficient of friction such as PTFE to reduce wear. In addition, it can also be estimated that if a slider member comprises a material containing at least PTFE, drive efficiency of a motor can also be improved.

With the above examinations, an alternative material of a fluorine resin such as a perfluoroalkoxy fluoroplastic (PFA) or an ethylene-tetrafluoroethylene copolymer (ETFE). The content of the fluoroplastic preferably falls within the range of 3 to 1000 wt. %, and more preferably, is 30 wt. % or more.

As for the durability, only the slider member No. 6 is much superior to other slider members, i.e., has a durability-limit rotation count of 80,0000 reversible rotations. Such superiority is caused by the fact that the slider member No. 6 has a content of a material of a low coefficient of friction (PTFE) as very high as 80 wt. %, and also contains a lubricant material, i.e., molybdenum disulfide. In this manner, when a slider member is formed by filling above 1 to 20 wt. % of a lubricant material (molybdenum disulfide) in a base containing 50 wt. % or more of a material of a low coefficient of friction (PTFE), thus obtaining a motor having high efficiency, wear resistance, and durability.

As for only the durability, with the above examinations, an alternative lubricant material such as carbon may be considered in addition to molybdenum disulfide described above. The content of such a lubricant material preferably falls within the range of 1 to 20 wt. % and more preferably, is about 10 wt. % in order to attain lubricity.

Sticking can be reasoned by the relationship between a material constituting the slider member and a stator material. More specifically, the slider member No. 6 is formed by filling an inorganic material, i.e., a glass fiber which originally has almost no sticking property in addition to materials free from sticking with respect to a fluoroplastic (PTFE) and a lubricant material (molybdenumdisulfide). Since a stator employs an invar material which is resistant against a chemical change such as rusting in combination with the above-mentioned slider member, a sticking reaction never occurs when the slider member and the stator are combined.

In combinations of the slider member No. 6 and stators of materials other than the invar material (phosphor bronze and SUS301), sticking or sticking tendency is observed since phosphor bronze is not resistant against a chemical change and SUS301 is also not so resistant against a chemical change as compared to the invar material. Sticking of the slider member No. 5 is caused by the sticking property of the EKonol E101 contained therein.

As for only sticking, with the above examinations, alternative materials of inorganic materials such as titanium oxide, potassium titanate, and the like may be used in addition to the above composition.

As described above, according to the embodiment of the present invention, a slider member of a rotor driven by a stator formed of a nickel-iron alloy is formed to contain 3 to 100 wt. % of a fluoroplastic, so that a motor having high efficiency and wear resistance as shown in TABLE 2 can be provided, and is suitable for a product which is required to be used over a long period of time.

If a slider member is formed of a material containing a fluoroplastic (50 wt. % or more) and a lubricant material (1 to 20 wt. %), a motor having high efficiency, wear resistance, and durability can be provided.

Furthermore, if a slider member is formed of a material containing a fluoroplastic (3 to 80 wt. %), a lubricant material (1 to 20 wt. %), and an inorganic material (1 to 30 wt. %), a motor which has high efficiency, wear resistance, and durability, and which is free from sticking between a stator and a slider member can be provided. The motor is suitable for a maintenance-free product such as a camera. When the motor is used in a maintenance-free product such as a camera, sticking is most important in the test items. In this case, a material formed of only a sticking-free material such as the slider member No. 6 is preferable.

Other embodiments of the present invention will be described below with reference to FIGS. 7 to 9.

Figure 7:
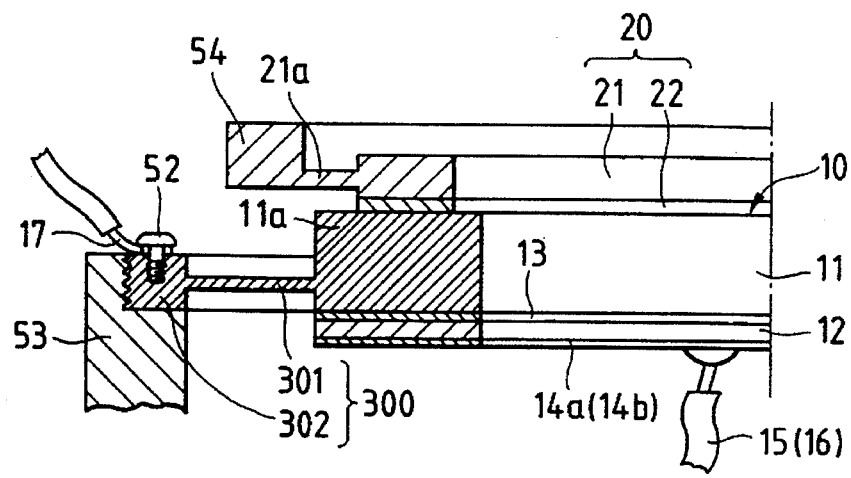
FIG. 7 is a sectional view showing still another embodiment of an ultrasonic motor according to the present invention.
Figure 10:
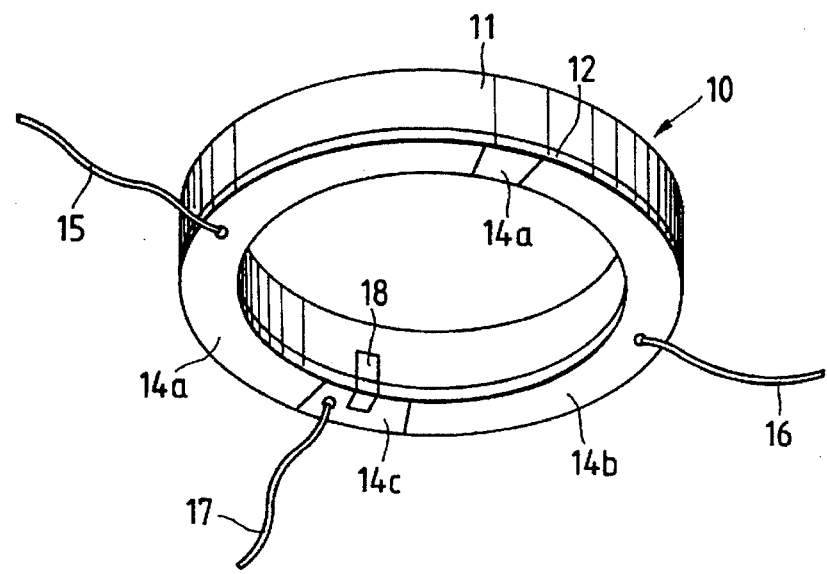
Figure 11:
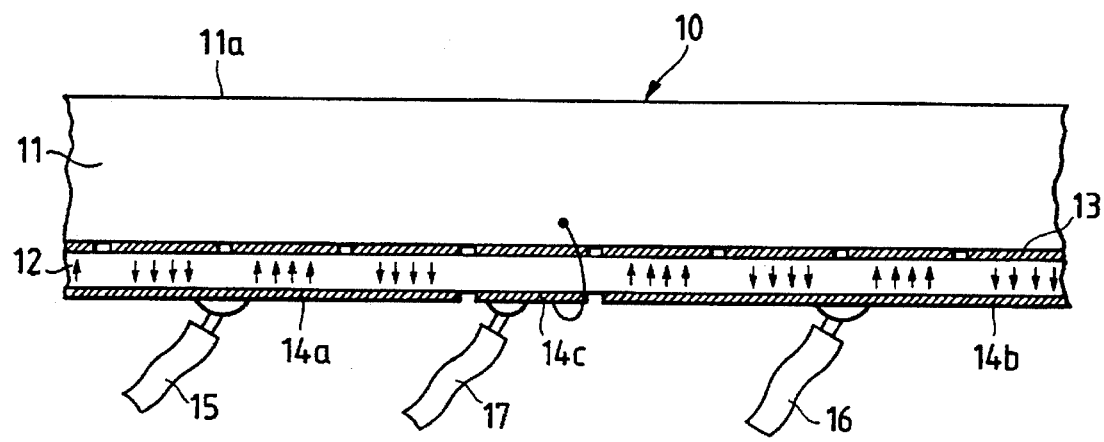

FIG. 7 is a sectional view showing an ultrasonic motor according to the present invention. A first electrode 13 is formed on an upper surface of a piezoelectric member 12 constituting a stator 10, and second electrodes 14a and 14b are formed on its lower surface. A conductive elastic member 11 is coupled to the piezoelectric member 12 so as to be electrically connected to the electrode 13. The electrodes 14a and 14b are connected to lead wires 15 and 16 in the same manner as in FIGS. 10 and 11. The elastic member 11 is formed of a conductive material such as phosphor bronze, stainless steel, or invar.

A flange-like support member 300 radially extends from the outer peripheral surface of the elastic member 11 near a neutral surface of the stator 10 as a whole by integral molding. The support member 300 has a thin plate portion 301 contiguous with the outer peripheral surface of the elastic member 11 and having a thickness of about 0.3 mm, and a thick portion 302 contiguous with the thin plate portion 301. The thickness of the thick portion 302 is sufficiently larger than that of the thin plate portion 301. A male thread is formed on the peripheral surface of the thick portion 302, and is threadably engaged with a female thread formed on the inner peripheral surface of an annular fixing member 53, thereby fixing and holding the elastic member 11. The other end of a lead wire 17, one end of which is grounded, is mounted on the upper surface of the thick portion 302 by a screw 52.

A rotor 20 is constituted by adhering an annular slider member 22 to an annular rotor base 21. A flange portion 21a radially projects from a portion of the rotor base 21 near a neutral surface of the rotor as a whole, and a support member 54 is integrally molded on the peripheral edge of the flange portion 21a. A compression force generated by a compression means (not shown) is transmitted to the rotor 20 through the support member 54, thereby urging the lower surface of the slider member 22 against a drive surface 11a of the elastic member 11.

In the above structure, the electrode 13 is grounded through the elastic member 11, its support member 300, and the lead wire 17. As described above, a predetermined AC voltage is applied to the electrodes 14a through the lead wire 15, and an AC voltage having a 90° phase difference from the predetermined voltage is applied to the electrode 14b through the lead wire 16. Upon application of these voltages, the piezoelectric member 12 vibrates, and a traveling vibration wave is generated on the drive surface 11a of the elastic member 11. As a result, the rotor 20 is driven. In this case, the thick portion 302 of the support member 300 is not vibrated since it is fixed to the fixing member 53.

As described above, the support member 300 and the elastic member 11 are integrally formed, and the lead wire 17 is connected to the thick portion 302 of the support member 300 to ground the electrode 13. Therefore, no conductive adhesive 18 (FIG. 10) is necessary. The thick portion 302 is not almost influenced by the vibration of the piezoelectric member 12, and does not cause a grounding error due to vibration of the elastic member 11 unlike in the conventional structure. In addition, no undesirable vibration acts on the elastic member.

The thick portion 302 is not always necessary to prevent a grounding error of electrodes as an object of the present invention. That is, the distal end of the thin plate portion 301 may be fixed and held by a fixing member. In the above structure, the lead wire 17 and the screw 52 constitute a grounding means.

Figure 8:
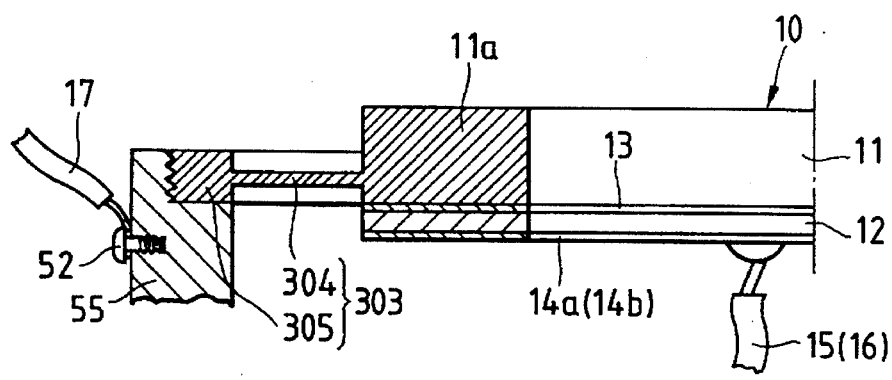
FIG. 8 is a sectional view showing another embodiment of a stator, a support member, and a fixing member constituting the ultrasonic motor according to the present invention.
Figure 9:
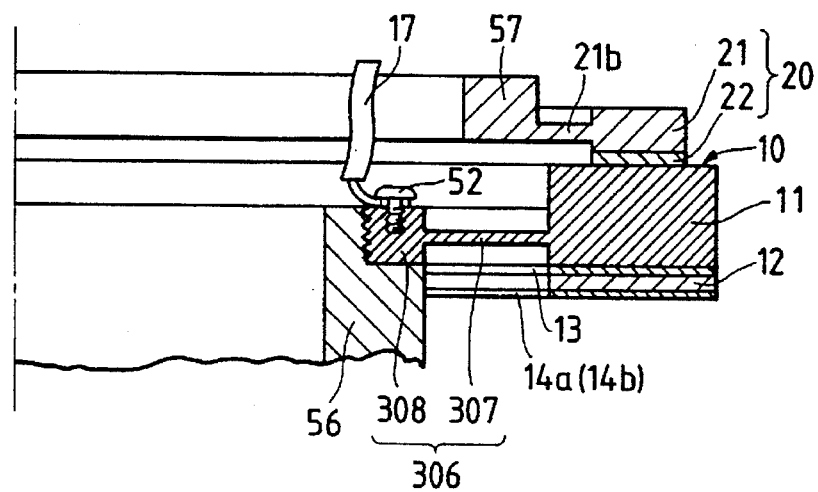
FIG. 9 is a sectional view showing still another embodiment of an ultrasonic motor according to the present invention.

As shown in FIG. 8, a fixing member 55 may be formed of a conductive material, the grounding lead wire 17 may be fixed to the fixing member 55 by the screw 52, and the electrode 13 may be grounded through the elastic member 11, a support member 303, the fixing member 55, and the lead wire 17.

In the above structures, the lead wire 17 is connected to the thick portion 302 or the fixing member 55 by the screw 52 but may be soldered thereto. A printed circuit board may be used in place of the lead wire 17. In addition, the male thread is formed on the peripheral edge of the thick portion 302 or 305, and the threaded portion is threadably engaged with the fixing member. However, the thick portion 302 or 305 may be fixed to be vertically clamped by a pair of fixing members.

In the above structures, the support member 300 or 303 is formed on the outer peripheral surface of the elastic member 11. However, as shown in FIG. 9, a support member 306 may be formed on the inner peripheral surface of the elastic member 11, and the support member may be fixed by a fixing member 56 inside the elastic member 11.

Other embodiments of the present invention will be described below with reference to FIGS. 12 to 16.

Figure 12:
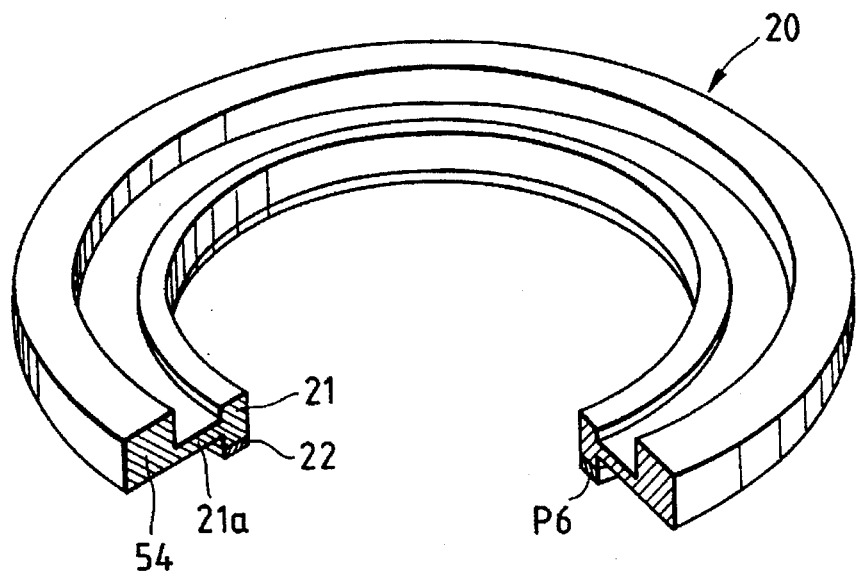
FIGS. 12 and 13 are perspective views showing another embodiment of a rotor, a stator, and a support member constituting the ultrasonic motor according to the present invention.
Figure 13:
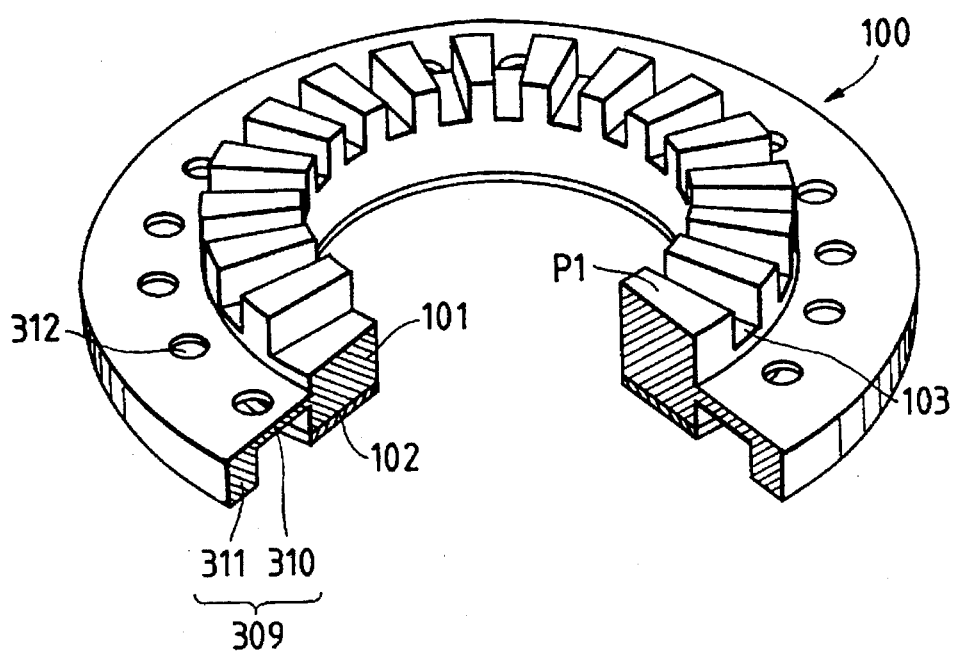

FIG. 12 is a perspective view of a rotor constituting an ultrasonic motor according to the present invention, and FIG. 13 is a perspective view of a stator constituting the ultrasonic motor according to the present invention. A stator 100 comprises a ring-like elastic member 101 of, e.g., phosphor bronze, stainless steel, invar, or the like, and a ring-like piezoelectric member 102 adhered to the elastic member 101. Comb-like grooves 103 are formed at the side of a drive surface P1 of the elastic member 101.

A flange-like support member 309 is formed integrally with the elastic member 101. The support member 309 comprises a thin plate portion 310 radially projecting from the outer peripheral surface of the elastic member 101 near a neutral surface of the stator 100 as a whole, and a thick portion 311 integrally formed at the distal end of the thin plate portion 310. The thick portion 311 is fixed by a fixing member (not shown). A plurality of holes 312 are formed by etching in portions of the thin plate portion 310 located on extending lines of the comb-like grooves 103.

A rotor 20 is constituted by adhering a ring-like slider member 22 to a ring-like rotor base 21. A flange portion 21a radially projects from the outer peripheral surface of the rotor base 21 near a neutral surface of the rotor 20 as a whole. A support member 54 is integrally molded on the outer edge of the flange portion 21a. A compression force generated by a compression member (not shown) is transmitted to the rotor 20 through the support member 54, thus urging a lower surface P6 of the slider member 22 against the drive surface P1 of the elastic member 101.

The operation of this embodiment will be described below.

When an AC voltage is applied to the piezoelectric member 102, the piezoelectric member 102 causes bending-vibration, and a traveling vibration wave is generated in the drive surface P1 of the elastic member 101. The vibration wave drives the rotor 20. In this case, since a portion of the elastic member 101 formed with the comb-like grooves 103 has a smaller thickness than those of other portions, this portion serves as a bending portion of the vibration wave. In this case, since the neutral surface of the stator 100 is located below as compared to a case without the grooves 103, the amplitude of the vibration wave is increased, thus improving drive efficiency of the rotor 20.

Since the holes 312 are formed in portions of the thin plate portion 310 of the support member 309, which are located on extending lines of the comb-like grooves 103, the following advantages are obtained.

Figure 14:
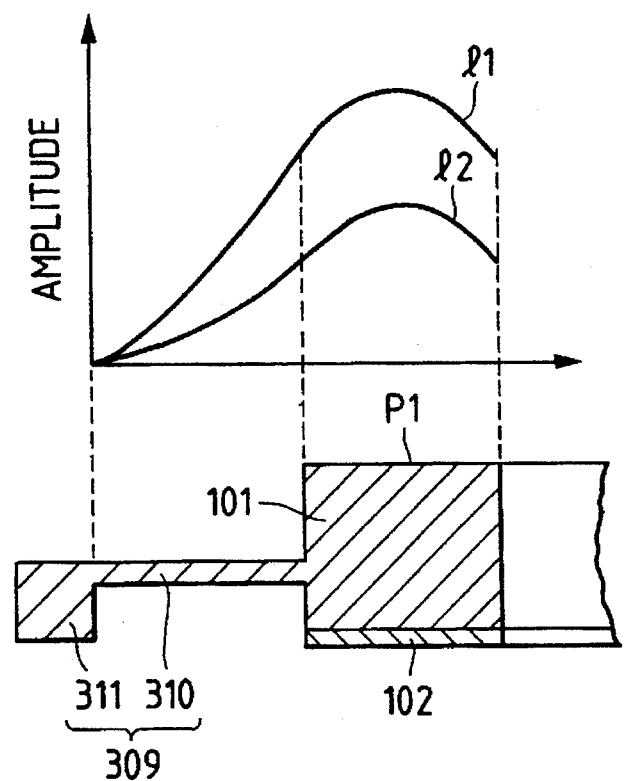
FIG. 14 shows an amplitude of a vibration wave acting on the stator and the support member in the embodiment shown in FIG. 13.

Since the portion of the elastic member 101 with the grooves 103 serves as the bending portion of the vibration wave, the portions of the thin plate portion 310 located on the extending lines of the grooves 103 also serve as bending portions. Since the holes 312 are formed at the bending portions, a bending strength of these portions is decreased, and these portions can be easily bent, thus increasing an amplitude. This also causes a decrease in support loss and improvement of drive efficiency of a motor. FIG. 14 shows vibration amplitudes of respective portions of the stator 100 in the radial direction. In FIG. 14, a curve l1 represents a case wherein the holes 312 are formed in the thin plate portion 310, and a curve l2 represents a case wherein no holes 312 are formed. As can be seen from FIG. 14, vibration amplitudes of respective portions with the holes 312 can be increased as compared to those without holes.

Since the bending strength of the support member 309 is decreased, vibration is never externally transmitted through the support member 309, thus preventing noise. In this embodiment, since the holes 312 are formed by etching, no residual stress is produced in the support member 309.

Figure 15A:
FIGS. 15A to 15G show patterns of a comb-like groove and a plurality of holes formed in the elastic member and the support member in the embodiment shown in FIG. 13.
Figure 15B:
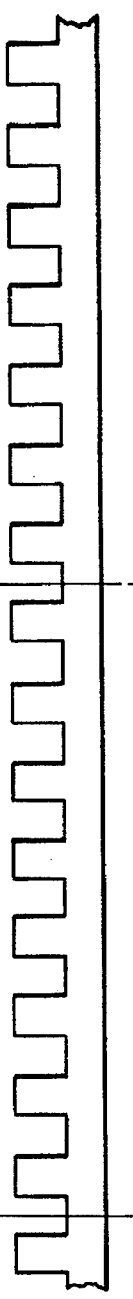
Figure 15C:
Figure 15D:
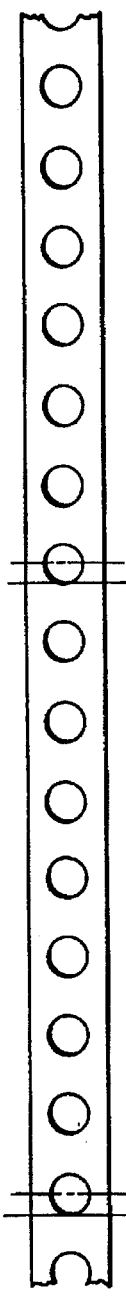
Figure 15E:
Figure 15F:
Figure 15G:
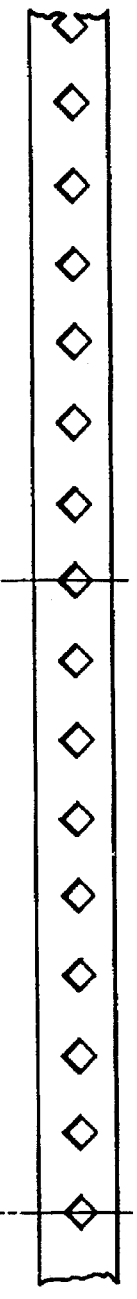

In the above structure, the holes 312 are formed at positions on the thin plate portion 310 on the extending lines of the comb-like grooves 103. However, the holes 312 need only be regularly formed in the circumferential direction of the support member 309, and more preferably, need only be regularly formed in association with the wavelength component of the traveling vibration wave generated in the elastic member 101. If the holes 312 are regularly formed in association with the cycle of the comb-like grooves 103, they can provide the above-mentioned effect. FIGS. 15A to 15G show another embodiment of holes 312 formed in the thin plate portion 310 in the relationship between a traveling vibration wave and the comb-like grooves 103. FIG. 15A is a chart of a traveling vibration Wave, and FIG. 15B shows comb-like grooves. Eight comb-like grooves are formed within one wavelength component of the traveling vibration wave. FIGS. 15C to 15G show thin plate portion patterns of a support member. FIG. 15C shows a pattern wherein holes corresponding in number to the comb-like grooves are aligned at equal intervals in the circumferential direction so that the centers of the grooves and holes coincide with each other. With this pattern, a support loss can be minimized. FIG. 15D shows substantially the same pattern as in FIG. 15C except that the centers of the comb-like grooves and the holes do not coincide with each other. FIG. 15E show a pattern wherein every other holes in FIG. 15C are formed. FIG. 15F shows a pattern wherein the holes are aligned in units of half wavelengths of the traveling vibration wave. FIG. 15G shows a pattern wherein each hole has a modified shape other than a circle.

As shown in FIG. 15G, the shape of each hole 312 is not limited to a circular or rectangular shape, but may be an elliptic shape or any other shapes.

Figure 16:
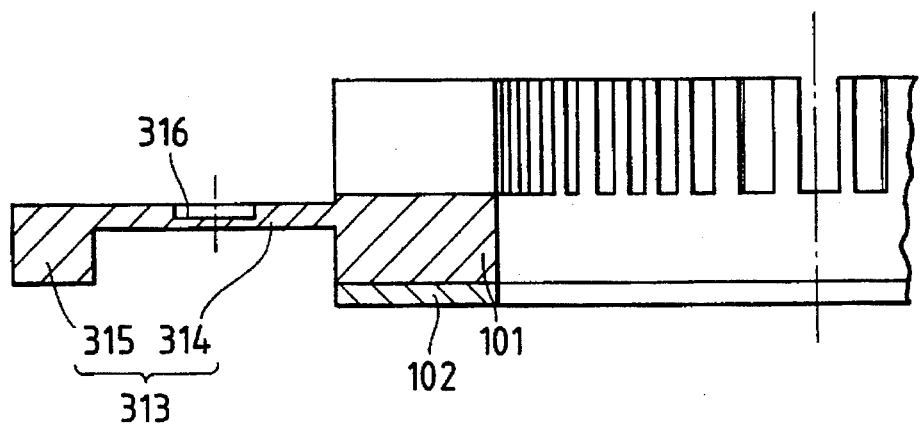
FIG. 16 is a sectional view showing another structure of holes formed in the support member in the embodiment shown in FIG. 13.

In the above description, the support member 309 is formed on the outer peripheral surface of the elastic member 101 but may be formed on its inner peripheral surface. Furthermore, the holes 312 are formed as through holes. However, the holes may be formed as recessed grooves 316, as shown in FIG. 16. That is, in the present invention, the hole means not only a through hole but also a non-through recessed groove (FIG. 16), a dimple, and the like.

Still another embodiment of the present invention will be described below with reference to FIG. 2.

As shown in FIG. 2, after a piezoelectric member 102 is adhered to a junction surface P2 of an elastic member 101, an adhesive 400 is applied to upper and lower end faces P4 and P3 of a thick portion 32 of a support member 30, a surface P7 of a fixing cylinder 50, and a surface P5 of a pressing 40, and the pressing 40 is threadably engaged with the fixing cylinder 50 so that the surfaces P7 and P4, and the surfaces P5 and P3 are brought into contact with each other. Thus, the thick portion 32 is vertically clamped and fixed by the fixing cylinder 50 and the pressing 40. At this time, the lower end face P3 of the thick portion 32 and the surface P5 of the pressing 40 are polished, and the adhesive between the surfaces P7 and P4 and between the surface P5 and the end face P3 serves as a filler. Therefore, the flatness of the drive surface P1 of the elastic member 101 will not be degraded. Therefore, the support member 30 integrally provided to the stator 100 is adhered to the fixing cylinder 50 and the pressing 40 and is clamped by the cylinder 50 and the ring 40, so that a support loss can be reduced and reliability can be improved. In addition, since external transmission of vibration can be prevented, noise can be stopped.

As shown in FIG. 5, when a support member 36 is formed on the inner peripheral surface of an elastic member 10, an adhesive 400 can be filled between a thick portion 38 and a pressing 41 and a fixing cylinder 51 when it is clamped by the pressing 41 and the fixing cylinder 51, thus obtaining the same effect as described above.

We claim:

1. A vibration driven motor which comprises:

a vibration member having an electro-mechanical converting element vibrated by a drive signal, and an elastic member which generates a vibration in a drive surface thereof upon vibration of said electro-mechanical converting element;

a relative moving element which is urged against the drive surface of said elastic member and is driven by the generated vibration;

a support member which has a circular flange-like shape and is integrally formed with said elastic member so as to project from an outer or inner periphery thereof; and a fixing member which fixes and supports said support member, wherein an adhesive is disposed between a peripheral portion of said support member and said fixing member.

2. A vibration driven motor according to claim 1, wherein said support member has a thin plate portion projecting from an outer periphery of said elastic member, and a thicker portion projecting from an outer periphery of said thin plate portion, said adhesive being disposed between said thicker portion of said support member and said fixing member.

3. A vibration driven motor according to claim 2, wherein said thicker portion of said support member and said fixing member are connected electrically to each other.

4. A vibration driven motor according to claim 2, wherein said thicker portion has a polished surface in contact with said fixing member.

5. A vibration driven motor according to claim 1, wherein said support member has an adhesion surface substantially parallel to the drive surface of said vibration member, said adhesive being disposed between said adhesion surface and said fixing member.

6. A vibration driven motor according to claim 1, wherein said fixing member comprises a pair of cooperable elements that clamp said support member therebetween, said adhesive being disposed between juxtaposed surfaces of said support member and said cooperable elements, respectively.

7. A vibration driven motor according to claim 6, wherein one of said cooperable elements is threaded into the other of said cooperable elements in order to clamp said support member therebetween.

8. A vibration driven motor according to claim 6, wherein said support member has a thin plate portion projecting from a periphery of said elastic member and a thicker portion projecting from a periphery of said thin plate portion, said thicker portion being clamped between said cooperable elements.

* * * * *